United States Patent [19]

Wiesner, Jr.

[11] Patent Number: 5,406,798
[45] Date of Patent: Apr. 18, 1995

[54] PILOT FUEL COOLED FLOW DIVIDER VALVE FOR A STAGED COMBUSTOR

[75] Inventor: Charles E. Wiesner, Jr., Glastonbury, Conn.

[73] Assignee: United Technologies Corporation, Hartford, Conn.

[21] Appl. No.: 141,318

[22] Filed: Oct. 22, 1993

[51] Int. Cl.⁶ .................... F02C 1/00; F16K 49/00
[52] U.S. Cl. .................................. 60/734; 60/740; 137/339
[58] Field of Search .............. 60/733, 734, 740, 746, 60/747; 137/339, 340

[56] References Cited

U.S. PATENT DOCUMENTS

| | | | |
|---|---|---|---|
| 4,265,615 | 5/1981 | Lohmann et al. | 431/353 |
| 4,817,389 | 4/1989 | Holladay et al. | 60/739 |
| 4,890,453 | 1/1990 | Iwai et al. | 60/39.465 |
| 4,903,478 | 2/1990 | Seto et al. | 60/39.281 |
| 4,949,538 | 8/1990 | Iasillo et al. | 60/39.465 |
| 4,964,270 | 10/1990 | Taylor | 60/39.094 |
| 4,993,222 | 2/1991 | Iwai et al. | 60/39.06 |
| 5,003,771 | 4/1991 | Kester et al. | 60/243 |
| 5,099,644 | 3/1992 | Sabla et al. | 60/267 |
| 5,121,597 | 6/1992 | Urushidani et al. | 60/39.06 |
| 5,127,221 | 7/1992 | Beebe | 60/39.02 |
| 5,127,229 | 7/1992 | Ishibashi et al. | 60/747 |
| 5,142,858 | 9/1992 | Ciokajlo et al. | 60/39.33 |
| 5,142,871 | 9/1992 | Lampes et al. | 60/756 |
| 5,154,060 | 10/1992 | Walker et al. | 60/746 |

OTHER PUBLICATIONS

I. Segalman, R. G. McKinney, G. J. Sturgess and L-M. Huang, "Reduction of NOx by Fuel-Staging in Gas Turbine Engines—A Commitment to the Future", pp. 29-1-29-17, Date Unknown.

K. Aoyama and S. Mandai, "Development of a Dry Low NOx Combustor for a 120-MW Gas Turbine", Oct. 1984, vol. 106, pp. 795-800, Journal of Engineering for Gas Turbines and Power.

S. J. Markowski, R. P. Lohmann, R. S. Reilly, "The Vorbix Burner—A New Approach to Gas Turbine Combustors", Jan. 1976, pp. 123-129, Journal of Engineering for Power.

Primary Examiner—Richard A. Bertsch
Assistant Examiner—Howard R. Richman

[57] ABSTRACT

A main flow divider valve for a main stage of a multistage combustor includes a cooling loop for flowing pilot fuel therethrough to remove heat from the main flow divider valve. Various construction details are disclosed which provide cooling of the main flow divider valve during pilot only operation of the multistage combustor. In a particular embodiment, the main flow divider valve includes a cooling loop disposed about a housing of the main flow divider valve. The cooling loop has an inlet in fluid communication with a first port of a relief valve and an outlet in fluid communication with the pilot fuel lines. The cooling loop receives a flow of pilot fuel during all operational conditions of the gas turbine engine.

5 Claims, 3 Drawing Sheets

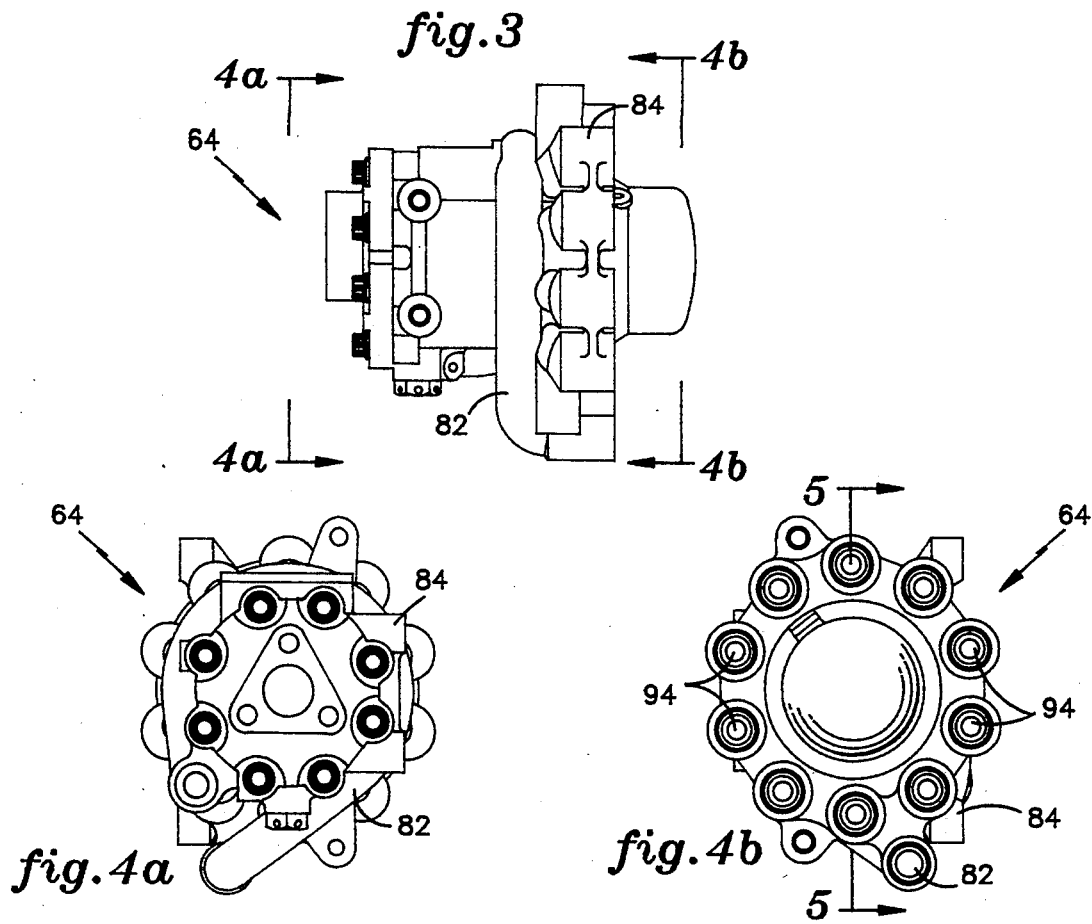

PILOT FUEL COOLED FLOW DIVIDER VALVE FOR A STAGED COMBUSTOR

TECHNICAL FIELD

This invention relates to a flow divider valve for a gas turbine engine, and more particularly to a flow divider valve for a main stage of a gas turbine engine having a multi-stage combustor.

Although the invention was developed in the field of aircraft engines, it has application in other fields where gas turbine engines having multi-stage combustors are used.

BACKGROUND OF THE INVENTION

A typical gas turbine engine includes a compressor section, a combustor and a turbine section. Working fluid flowing through the gas turbine engine is compressed in the compressor section to add energy to the working fluid. The compressed working fluid exits the compressor section and enters the combustor. In the combustor, the working fluid is mixed with a supply of fuel and ignited. The products of combustion are then flowed through the turbine section where energy is extracted from the working fluid. A portion of the extracted energy is transferred back to the compressor section to compress incoming working fluid and the remainder may be used for other functions.

Gas turbine engines are required to function efficiently over a range of operating conditions. For a gas turbine engine used in aircraft applications, low power operation corresponds to idle, high power operation corresponds to take-off and climb, with cruise and approach/descent falling in an intermediate thrust region between low and high power. At low power, fuel/air ratios must be kept relatively rich to avoid blow-out. Blow-out occurs when the fuel/air ratio within the combustor drops below a lean stability limit. As a result of the low combustion temperature and pressure, combustion efficiency is relatively low. At high power, the fuel/air ratio is near stoichiometric to maximize efficiency.

The combustion process generates numerous byproducts such as smoke particulate, unburned hydrocarbons, carbon monoxide, and oxides of nitrogen. At low power, the lower combustion efficiency results in the production of unburned hydrocarbons and carbon monoxide. At high power, the production of oxides of nitrogen increases as the operating temperature and residence time increase. Residence time is defined as the amount of time the combustion mixture remain above a particular temperature. Reducing the operating temperature may reduce the output of the gas turbine engine. Reducing the residence time, may result in less efficient combustion and higher production of carbon monoxide. For environmental reasons, these byproducts are undesirable. In recent years, much of the research and development related to gas turbine engine combustion has focused on reducing the emission of such byproducts.

A significant development in gas turbine engine combustors has been the introduction of multiple stage combustors. A multiple stage combustor typically includes a pilot stage, a main stage, and possibly one or more intermediate stages. An example of such a combustor is disclosed in U.S. Pat. No. 4,265,615, issued to Lohmann et al and entitled "Fuel Injection System for Low Emission Burners".

At low power only the pilot stage is operated. This permits fuel/air ratios nearer to stoichiometric and the efficiency at idle is thereby increased and the production at idle of unburned hydrocarbons and carbon monoxide is reduced. At high power the pilot stage and one or more of the other stages is operated. Having multiple stages reduces the residence time within each particular stage, relative to a single large combustion chamber. The lower residence time results in lower production of oxides of nitrogen. Having multiple stages also permits the equivalence ratio to be optimized over a range of operating conditions. As a result of having multiple stages rather than a single stage, the emission of unwanted combustion byproducts is reduced and the overall efficiency is improved.

A fuel supply system for a staged combustor is required to supply fuel to each stage as needed and to evenly distribute the fuel between the fuel injectors in each stage. One way of accomplishing this is to have an annular manifold surrounding each stage and a switching valve which distributes the fuel to each of the manifolds. An example of such a fuel supply system is described in U.S. Pat. No. 4,903,478 issued to Seto et al and entitled "Dual Manifold Fuel System". As described therein, the fuel system includes a first fuel manifold, a second fuel manifold, a fuel control directing fuel to the manifolds, and a shut-off valve disposed between the fuel control and the second fuel manifold. The shut-off valve opens and closes in response to the operating condition of the engine. A drawback to this configuration is that with the shut-off valve closed, fuel may drain from the main fuel manifold. Before starting the main stage, the fuel manifold and associated fuel lines have to be pre-filled. Pre-filling the main manifold and associated fuel lines may degrade the responsiveness of the fuel supply system unless this limitation is accommodated in some fashion.

In U.S. Pat. No. 4,964,270, issued to Taylor et al and entitled "Gas Turbine Engine Fuel System", another type of dual manifold system is disclosed. In the system described therein, a solenoid valve prevents fuel flow through a starter manifold during normal engine operation. The fuel system further includes a drain system to purge the starter manifold of fuel. The fuel is purged, rather than permitting small amounts of fuel to flow through the manifold for cooling, to prevent coking of fuel in the fuel injectors connected to the starter manifold.

Another type of fuel supply system utilizes a flow divider valve, or fuel distribution valve, for each stage. The flow divider valve distributes the flow to the fuel injectors in each stage. An example of a flow divider valve is described in U.S. Pat. No. 5,003,771 issued to Kester et al and entitled "Fuel Distribution Valve for a Combustion Chamber". In this type of system, the function of the shut-off valve described above is incorporated into the flow divider valve. The flow divider valves replace the large manifolds and, as a result, reduces the amount of pre-filling necessary.

The above art notwithstanding, scientists and engineers under the direction of Applicants' Assignee are working to develop responsive and robust fuel supply systems for staged combustors.

DISCLOSURE OF THE INVENTION

The present invention is predicated in part upon the recognition that closing a main stage divider valve of a multi-stage combustor during pilot-only operation may result in fuel leakage from the divider valve. During staged operations, main stage fuel flowing within the divider valve will remove heat from the divider valve. During pilot operation, however, no main stage fuel flow is present and the corresponding heat removal from the divider valve is eliminated. Overheating of the divider valve may result in damage to seals within the divider valve or damage to the structural integrity of the divider valve body. In addition, subjecting the static fuel present within the flow divider valve during pilot-only operation to the heat of the pilot combustion may lead to coking of the static fuel and degradation of the flow divider valve.

According to the present invention, a main flow divider valve includes a cooling loop in fluid communication with a pilot fuel line. Pilot fuel, which flows during all operational conditions of the gas turbine engine, will flow through the divider valve to remove heat from the divider valve even if the main flow valve is closed.

According to a specific embodiment of the present invention, a fuel supply system for a multi-stage combustor includes a main flow divider valve having a cooling fluid inlet, a cooling fluid outlet, and a cooling loop extending between the cooling fluid inlet and the cooling fluid outlet and defining a passage for flowing pilot fuel through the divider valve.

According to a further embodiment, the fuel supply system includes a relief valve disposed in the pilot fuel line, the relief valve having a first port connected to the cooling loop via a cooling line and a second port connected to the pilot fuel injectors. The relief valve opens if the fluid pressure within the cooling line exceeds a threshold level such that a portion of the pilot fuel bypasses the main flow divider and flows directly to the pilot fuel injectors.

A principle feature of the present invention is the cooling loop integral to the main flow divider valve. A feature of a particular embodiment is the fuel supply system having a cooled main flow divider. A feature of a further embodiment is the relief valve in the pilot fuel line.

A primary advantage of the present invention is the minimal risk of fuel leakage due to heat damaged seals as a result of the main flow divider valve being cooled during all operating conditions of the engine. Pilot fuel, which flows during all operating conditions of the engine, flowing through the body of the flow divider valve cools the valve and prevents overheating of the seals disposed therein. Another advantage is the minimized risk of functional damage due to overheating the main flow divider valve housing and structure. The functioning components and the structural integrity of the divider valve are heat sensitive and are protected by the cooling loop. A further advantage is the minimized risk of coking within the valve during pilot operation. Since the main flow divider valve is closed during pilot operation, a portion of the main fuel is retained within the divider valve. This fuel is subjected to heat from the pilot combustion and, since it is static, is subject to this heat for extended residence times. This risk is minimized by reducing the temperature of the flow divider valve by transferring heat to the pilot flow. An advantage of the particular embodiment is the responsiveness of the fuel supply system as a result of eliminating the need to drain the main flow divider valve and associated main fuel lines during pilot-only operating conditions. Another advantage of the particular embodiment is the diversion of a portion of the pilot flow through the cooling loop as a result of the relief valve. Since only a portion is required for cooling, diverting only the necessary amount of pilot flow minimizes the size of the cooling loops and thereby the associated hardware. Further, the relief valve minimizes the variation in flow rate through the cooling loop, thus permitting the size of the cooling loop passage to be optimized for a small range of flow rates. The relief valve maintains a pressure across the cooling loop during operating conditions of the engine.

The foregoing and other objects, features and advantages of the present invention become more apparent in light of the following detailed description of the exemplary embodiments thereof, as illustrated in the accompanying drawings.

BRIEF DESCRIPTION OF THE DRAWINGS

FIG. 3 is a side view of a flow divider valve having a cooling loop.

FIGS. 4a and 4b are view taken along lines a—a and b—b, respectively, of FIG. 4.

FIG. 5 is a cross-sectional side view of the flow divider valve.

BEST MODE FOR CARRYING OUT THE INVENTION

Figure 1:
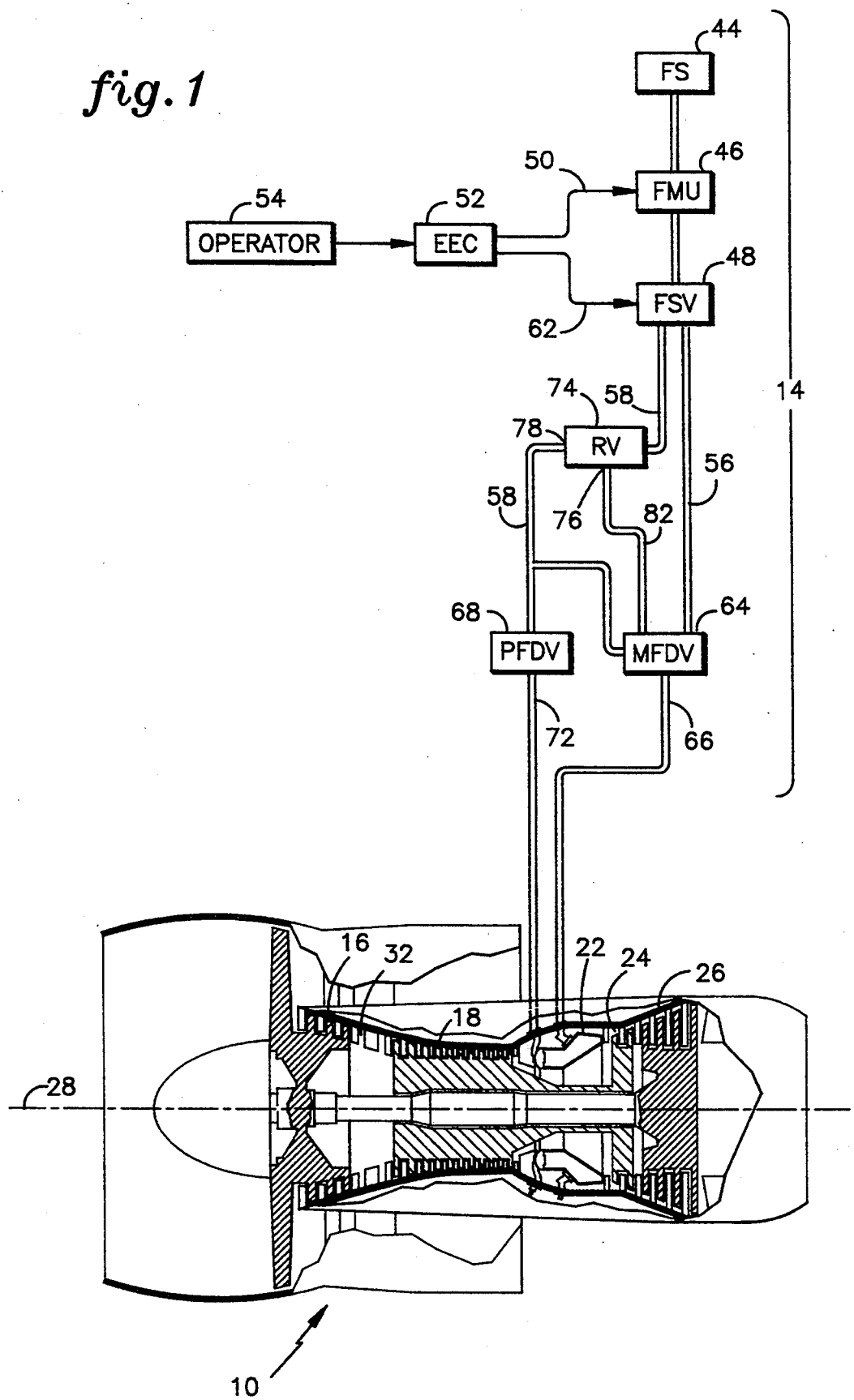
FIG. 1 is a cross-sectional view of a gas turbine engine having a dual stage combustor, including a fuel supply system.

FIG. 1 illustrates a gas turbine engine 10 and includes a schematic drawing of a fuel supply system 14. The gas turbine engine 10 includes a low pressure compressor 16, a high pressure compressor 18, a combustion section 22, a high pressure turbine 24, and a low pressure turbine 26. The gas turbine engine 10 is disposed about a longitudinal axis 28 and includes an annular flow path 32 disposed about the axis 28.

Figure 2:
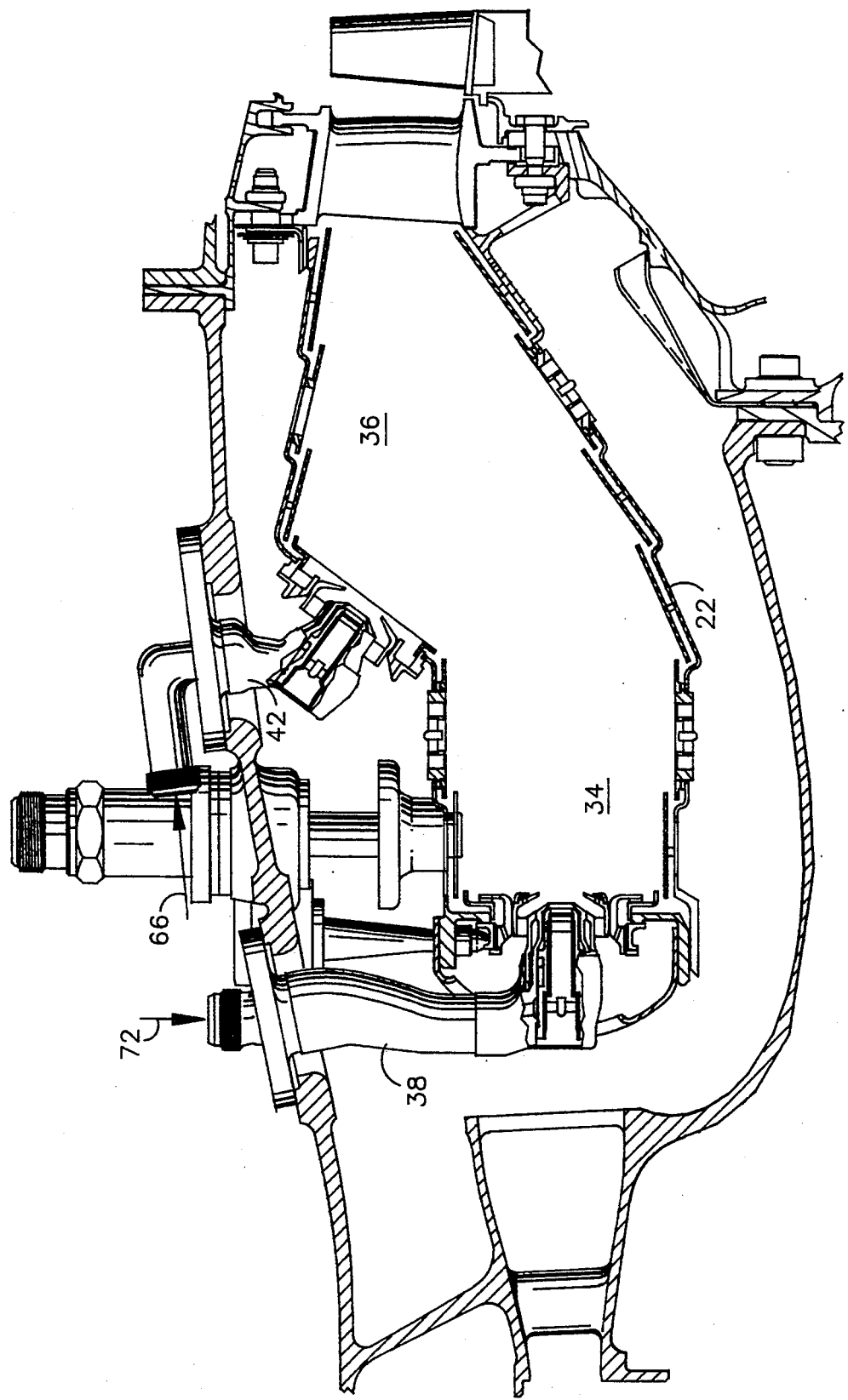
FIG. 2 is a partially sectioned side view of the dual stage combustor.

The combustion section 22 is illustrated in more detail in FIG. 2. The combustion section 22 is a multi-stage combustor and includes a pilot combustion region 34 and a main combustion region 36. Fuel is fed to the pilot combustion region 34 through a plurality of pilot fuel injectors 38 circumferentially spaced about the combustion section 22. Fuel is fed to the main combustion section 36 through a plurality of main fuel injectors 42 circumferentially spaced about the combustor 22 and, in the embodiment illustrated in FIG. 2, axially spaced downstream from the pilot fuel injectors. Although FIG. 2 illustrates a multi-stage combustor having a pilot stage and a main stage spaced circumferentially and axially from the pilot stage, the invention is equally applicable to other multi-stage combustor configurations.

The fuel supply system 14, as illustrated in FIG. 1, includes a fuel source 44 which is in fluid communication with a fuel metering means 46. The fuel metering means 46 meters the flow to a fuel splitter valve 48 in response to a control signal 50 from a controller 52. The controller 52 is typically an electronic engine control which responds to demands from an operator 54 of the engine. The fuel entering the fuel splitter valve 48 is then proportioned between a main fuel line 56 and a pilot fuel line 58. The ratio of main fuel flow to pilot fuel flow is controlled by the fuel splitter valve 48 in response to a second control signal 62 from the controller 52. Through control signals 50,62 to the fuel metering means 46 and the fuel splitter valve 48, the controller 52 determines the total fuel flow and the ratio of the fuel flow split between the main combustion section 36 and the pilot combustion section 34.

The fuel flowing through the main fuel line 56 flows into a main flow divider valve 64. The main flow divider valve 64 divides the flow of main fuel flow between the plurality of main fuel injectors 42. The flow of fuel from the main flow divider valve 64 is divided substantially equally between a plurality of main fuel injector lines 66 and the main fuel injectors 42. The fuel flowing in the pilot fuel line 58 also passes through the main fuel divider valve 56. Flowing pilot fuel through the main flow divider valve 64 provides means to cool the main flow divider valve 64. Due to the proximity of the main flow divider valve 64 to the engine hot section, overheating of the main flow divider valve 64 is a concern. This is especially true when the gas turbine engine 10 is operating the pilot combustion region 34 only. With the main combustion region 36 not operating, there is no flow of main fuel through the main flow divider valve 64. Overheating of the main flow divider valve 64 may cause coking of the static fuel within it and lead to degradation or inoperability of the main flow divider valve 64. The pilot fuel flowing through the main flow divider valve 64 then flows into a pilot flow divider valve 68. The pilot flow divider valve 68 equally distributes the flow of pilot fuel to the plurality of pilot fuel injectors 38 through a plurality of pilot fuel injector lines 72. Since the pilot combustion region 34 operates during all operating conditions of the gas turbine engine 10, pilot fuel continually flows through the pilot flow divider valve 68 and removes heat from it. Therefore, additional means of cooling to prevent coking within the pilot flow divider valve 68 may not be required.

Referring now to FIG. 1, fuel exiting the flow splitter valve 48 flows into a relief valve 74. The relief valve 74 has a first exit port 76 and a second exit port 78. The first exit port 76 feeds pilot fuel to a cooling loop 82 that flows about the main flow divider valve 64 and returns to the pilot fuel line 58. The second port 78 feeds pilot fuel directly into the pilot fuel line 58. The relief valve 74 directs all the pilot fuel to the first port 76 unless the fluid pressure within the pilot fuel line 58 exceeds a predetermined threshold level. If the fluid pressures exceeds this threshold level, the excess fuel is directed to the second port 78. In this way, the pressure drop across the cooling loop 82 is maintained. Although not shown in detail, the relief valve 74 is a conventional relief valve having a primary outlet for fluid flowing into the relief valve and a secondary outlet to direct a portion of the fluid if the fluid pressure exceeds a threshold value.

The main flow divider valve 64 is illustrated in more detail in FIGS. 3 to 5. The main flow divider valve 64 includes a housing 84 and a sleeve 86 disposed within a chamber 88 (not shown) of the housing 84. The sleeve 86 includes a plurality of ports 92 located cylindrically about the sleeve 86. Each port 92 is associated with one of a plurality of valve outlets 94 in fluid communication with the main fuel injectors 42. A spring loaded piston 96 having a surface 98 is slidably disposed within the sleeve 86. The surface 98 faces an cavity 102 that is in fluid communication with the main fuel line 56. Fuel entering the cavity 102 impinges on the surface 98 to generate a force on the piston 96 that is reacted by the spring. Sliding movement of the piston 96 permits the ports to be exposed to the fuel within the cavity 102. The greater the fuel pressure on the piston 96, the greater the fuel flow through the ports 92 and thus to the main fuel injectors 42.

The main flow divider valve 64 also includes a plurality of seals 104. These seals 104 are typically of the elastomer variety and provide means to seal against the escape of fuel. A first seal 106 is disposed about the connection between the main flow divider valve 64 and the main fuel line 56. This seal 106 prevents fuel from escaping into the environment external to the main flow divider valve 64. Fuel escaping into this area, since it is in a relatively hot section of the engine, may ignite. A second set of seals 108 are disposed about each of the valve outlets 94. These seals 108 also prevent fuel leaking into the environment external of the main flow divider valve 64. A third seal. 112 is disposed about the sleeve 86. This seal 112 prevents fuel from leaking between and into the ports 92.

If there is insufficient fuel pressure on the surface 98, such as when the fuel flow from the flow splitter valve 48 to the main flow divider valve 64 is shut off, the spring will force the piston 96 to close the ports 92 and eliminate fuel flow to the main fuel injectors 42. Even if closed, however, excess fuel remains in the cavity 102 of the flow divider valve 64.

In accordance with this embodiment of the present invention, the main flow divider valve 64 also includes the cooling loop 82 disposed about the housing 84. As described previously, the cooling loop 82 is in fluid communication with the pilot fuel line 58 via the relief valve 74. Pilot fuel, which flows continuously during all operating conditions of the gas turbine engine 10, removes heat from the main flow divider valve 64. This heat is removed to prevent overheating of the various seals 104, 108, 112 disposed about the main flow divider valve 64. As discussed previously, leakage from these seals 104, 108, 112 may cause fuel to be exposed to the environment about the main flow divider valve 64 or cause the main flow divider valve 64 to function improperly. Additionally, static fuel within the cavity 102 during pilot operation is subject to coking if the temperature within the cavity 102 exceeds a threshold level. The pilot fuel flowing through the cooling loop 82 removes heat from the main flow divider valve 64 and maintains the temperature of the main flow divider valve 64 below this level. Further, the housing 84 and other structure of the main flow divider valve 64, typically formed from aluminum, is subject to stresses during operation of the gas turbine engine 10. As is well known, the allowable stress of materials such as aluminum is inversely related to temperature. Maintaining the structural integrity of the main flow divider valve 64 requires the temperature of the housing 84 and other structure be maintained below a critical temperature.

As shown in FIGS. 4-5, the means to flow pilot fuel through the main flow divider valve 64 is via the cooling loop 82 disposed integral to and about the housing 84. This specific embodiment is an example of one configuration to use pilot fuel as a cooling fluid. Other configurations may perform equally well, including such configurations as directing a passage for pilot fuel directly through the housing.

Although the invention has been shown and described with respect with exemplary embodiments thereof, it should be understood by those skilled in the art that various changes, omissions, and additions may be made thereto, without departing from the spirit and scope of the invention.

What is claimed is:

1. A fuel supply system for a gas turbine engine, the gas turbine engine having a multi-stage combustor including a pilot stage and a main stage, the combustor being operable in a pilot mode, defined by having only the pilot stage operating, or a staged mode, defined by having both the pilot stage and the main stage operating, the fuel supply system including splitter means for distributing fuel flow between a pilot fuel line and a main fuel line, a main flow divider valve disposed in the main fuel line, a plurality of main fuel injectors in fluid communication with the flow divider valve via a plurality of main fuel injector lines, wherein the main flow divider valve includes:
   a main fuel inlet in fluid communication with the splitter means via the main fuel line;
   a plurality of main fuel outlets, each main fuel outlet in fluid communication with at least one of the main fuel injectors via the main fuel injector lines;
   a manifold means adapted to distribute the flow of fuel entering the main fuel inlet between the main fuel outlets;
   a cooling fluid inlet in fluid communication with the splitter means via the pilot fuel line;
   a cooling fluid outlet in fluid communication with the pilot stage; and
   a cooling loop, the cooling loop defining a passage for flowing cooling fluid between the cooling fluid inlet and the cooling fluid outlet, wherein pilot fuel flowing through the cooling loop transfers heat from the divider valve during operation of the gas turbine engine.

2. The fuel supply system according to claim 1, further comprising a relief valve located within the pilot fuel line, the relief valve disposed upstream of the cooling fluid inlet and having a first port in fluid communication with the cooling fluid inlet via a cooling line and a second port in fluid communication with pilot fuel injectors, wherein the relief valve opens in response to fluid pressure within the cooling line exceeding a predetermined threshold fluid pressure level, the open relief valve permitting a portion of the pilot fuel to bypass the main flow divider valve.

3. The fuel supply system according to claim 1, wherein the cooling loop is integral to the main flow divider valve.

4. A fuel divider valve for a gas turbine engine, the gas turbine engine having a multi-stage combustor including a pilot stage and a main stage, the combustor being operable in a pilot mode, defined by having only the pilot stage operating, or a staged mode, defined by having both the pilot stage and the main stage operating, the gas turbine engine including a fuel supply system including splitter means for distributing fuel flow between a pilot fuel line and a main fuel line, a plurality of main fuel injectors, a plurality of main fuel injector lines, and the divider valve, wherein the fuel divider valve includes:
   a main fuel inlet in fluid communication with the splitter means via the main fuel line;
   a plurality of main fuel outlets, each main fuel outlet in fluid communication with at least one of the main fuel injectors via the main fuel injector lines;
   a manifold means adapted to meter the flow of fuel to the plurality of main fuel injectors and to distribute the flow of fuel entering the main fuel inlet between the main fuel outlets;
   a cooling fluid inlet in fluid communication with the splitter means via the pilot fuel line; and
   a cooling fluid outlet in fluid communication with the pilot stage; and
   a cooling loop, the cooling loop extending between the cooling fluid inlet and the cooling fluid outlet and defining a passage for flowing cooling fluid, wherein pilot fuel flowing through the cooling loop transfers heat from the divider valve during operation of the gas turbine engine.

5. The fuel divider valve according to claim 4, wherein the cooling loop is integral to the fuel divider valve.

* * * * *